US012755428B2

(12) United States Patent
King Smith et al.

(10) Patent No.: US 12,755,428 B2
(45) Date of Patent: Oct. 6, 2026

(54) METHOD TO AUTOMATICALLY CALIBRATE CAMERAS AND GENERATE MAPS

(71) Applicant: SSY.AI Ltd, Dillon, CO (US)

(72) Inventors: Oliver Peter King Smith, Edinburgh (GB); Thomas Zoehrer, Dillon, CO (US); Lars Tinnefeld, Richmond Hill (CA); Daniel Rathmaier, Golden, CO (US)

( * ) Notice: Subject to any disclaimer, the term of this patent is extended or adjusted under 35 U.S.C. 154(b) by 259 days.

(21) Appl. No.: 18/560,375

(22) PCT Filed: May 11, 2022

(86) PCT No.: PCT/IB2022/054397
§ 371 (c)(1),
(2) Date: Nov. 10, 2023

(87) PCT Pub. No.: WO2022/238933
PCT Pub. Date: Nov. 17, 2022

(65) Prior Publication Data

US 2024/0233184 A1 Jul. 11, 2024

Related U.S. Application Data

(60) Provisional application No. 63/186,896, filed on May 11, 2021.

(51) Int. Cl.
*G06T 7/80* (2017.01)
*G06T 7/10* (2017.01)
*G06T 7/20* (2017.01)
*G06T 7/62* (2017.01)
*G06T 7/70* (2017.01)
*G06T 11/00* (2026.01)

(52) U.S. Cl.
CPC .................. *G06T 7/80* (2017.01); *G06T 7/10* (2017.01); *G06T 7/20* (2013.01); *G06T 7/62* (2017.01); *G06T 7/70* (2017.01); *G06T 11/00* (2013.01); *G06T 2207/10016* (2013.01); *G06T 2207/30244* (2013.01)

(58) Field of Classification Search
None
See application file for complete search history.

(56) References Cited

U.S. PATENT DOCUMENTS

2015/0055821 A1* 2/2015 Fotland ................ G06V 10/255 382/103
2016/0379074 A1* 12/2016 Nielsen ................. G01S 19/485 348/143
2020/0209401 A1* 7/2020 Motoyama ................ G06T 7/50
2020/0226361 A1* 7/2020 Murray .................. G06V 20/52

* cited by examiner

*Primary Examiner* — SJ Park
*Assistant Examiner* — Caroline E. Depalma

(57) ABSTRACT

Provided are a method and system for calibrating a camera to correct for perspective and lens distortion. The video camera provides images to a computer, which identifies objects and tracks their movement during a calibration period. Changes in size of the tracked objects are used to infer perspective and distortion in the video camera. A map of the room may be created noting locations of objects and flooring surfaces. Movement of objects along the floor may be measured more accurately using the calibrated camera images.

15 Claims, 10 Drawing Sheets

METHOD TO AUTOMATICALLY CALIBRATE CAMERAS AND GENERATE MAPS

CROSS-REFERENCE TO RELATED APPLICATIONS

This application claims the benefit of previously filed Patent Application U.S. 63/186,896 filed 11 May 2021 entitled "Method to Automatically Calibrate Cameras and Generate Maps." This is a National Stage Application of PCT/IB2022/054397 filed 11 May 2022.

FIELD OF APPLICATION

The present invention is in the technical field of video processing. More particularly, the present invention is in the field of tracking organic and non-organic objects. More particularly, the present invention is in the field of automatic calibration of cameras for accurately tracking organic and non-organic objects.

BACKGROUND OF THE INVENTION

Tracking organic and non-organic objects from cameras is a cost efficient and unobtrusive methodology. However, being able to generate paths including accurate metrics or accurate spaghetti maps, can be labor intensive and arduous. Modern cameras suffer from distortion. These distortions can lead to errors in path length when tracking objects. In wide angle lenses, these distortions can be significant, leading to straight lines being very curved when captured by the image sensor. In some cases, to save costs, the lenses are not even rectilinear. This means that the lens is specifically made to distort the image.

To correct for the distortions, camera lenses need to be tested against calibrated targets. Traditionally, when using targets to calibrate the camera lenses, the targets need to be carefully aligned with the lens. This costs money and time and needs to be done before cameras are installed.

Once a camera with its lens is installed, the system needs to be set up to straighten the image. The angle and height of the lens and camera must then be considered in order to generate an accurate spatial view from the camera. This requires a second manual calibration step, by placing targets on the ground at known locations.

Once the work has been done for calibrating the lens, the view can then be used for measuring the distance which organic or non-organic object move across the frame.

With all the above examples, it is clear that calibration of digital video systems is a serious hinderance.

SUMMARY OF THE INVENTION

The present invention is a method for automatically calibrating the cameras and reconstructing an accurate map of the space.

According to a first aspect of the invention there is provided a method of calibrating a video camera capturing a space comprising: receiving images from the camera; identifying objects within the images; tracking the identified objects as they move; using changes in size of the tracked objects as they move to infer perspective in the video camera; and using the inferred perspective to create a mapping model to convert pixels in the received images to a metrical map of the space.

According to a second aspect of the invention there is provided a method of creating a map from a video camera capturing a space comprising: receiving images from the camera; identifying objects within the images; tracking the identified objects as they move; using changes in size of the tracked objects to infer perspective in the images; determining parts of the objects that contact a floor to determine locations of ground pixels in the image; and creating a 2D metrical map of the space from the inferred perspective and the locations of ground pixels.

The method may use pose estimation to determine a leg as the part of the object contacting the ground.

The method may determine sizes of pixels at different location of the image.

The method may create corrected images from the received images by correcting for the perspective and distortion effects.

The objects may have fiduciary markings to uniquely identify them.

A segmentation model may be used to identify objects, preferably a semantic segmentation model.

The method may build up a statistical inference model of a height of the objects.

The method may classify objects as moving or stationary objects.

The method may input floor plans to constrain the map creation and register identified objects of the map to features of the floor plan.

The method may define a pose of the camera with respect to the room from the changes in size of the tracked objects.

Identifying and tracking objects may be performed during a calibration period.

At least some of the objects may carry an IMU to identify that object and its dimensions.

The method may continue to track objects using the mapping model to compute movement metrics for a given object.

According to a third aspect of the invention there is provided a system comprising:

one or more video cameras capturing a space; computer operatively connected to receive video from the one or more video cameras; a database of objects expected to be in that space and their dimensions; and a memory storing instructions, which when executed by the computer, cause the computer to carry out the above methods.

Additional aspects and embodiments of the invention will be provided, without limitation, in the detailed description of the invention that is set forth below.

DETAILED DESCRIPTION OF THE INVENTION

As described herein, calibrated cameras can be used for creating maps of a scene containing moving and stationary objects and tracking those objects accurately on those maps. The scene may be the inside of a structure, such as a room, sports facility, ship, warehouse, or factory. This information is extracted using video cameras. These cameras may already be installed, such as for video surveillance.

By tracking objects in the video frame, the software can build accurate/reliable maps. In one embodiment, the software identifies the pixels in the image corresponding to the floor in the map by looking at where the objects touch the floor in the video frame. In particular, the ground engaging pixels of an identified object or certain known parts are assumed to be where an object touches the floor in the real-world. These are the pixels contained in the object that are closest to the floor when projected by the normal vector to the floor onto the floor The software can measure the pixel size of the object at that location, and then extrapolate how far away from the camera it is or where precisely it is located in the video frame.

By building up a large dataset of objects in the video frame with those objects moving during a calibration period, the software can build up a 2D map of the floor/level surface. The map is a digital representation of locations of the space that is captured by the video camera. The map is a metrical map in the sense of capable of providing measurements between points.

As camera lenses can have distortion, the maps can have curvature. In one embodiment the camera distortion can be removed by studying how objects move inside the video frame, and by comparing how the distortions vary between cameras with overlapping video views.

Figure 1:
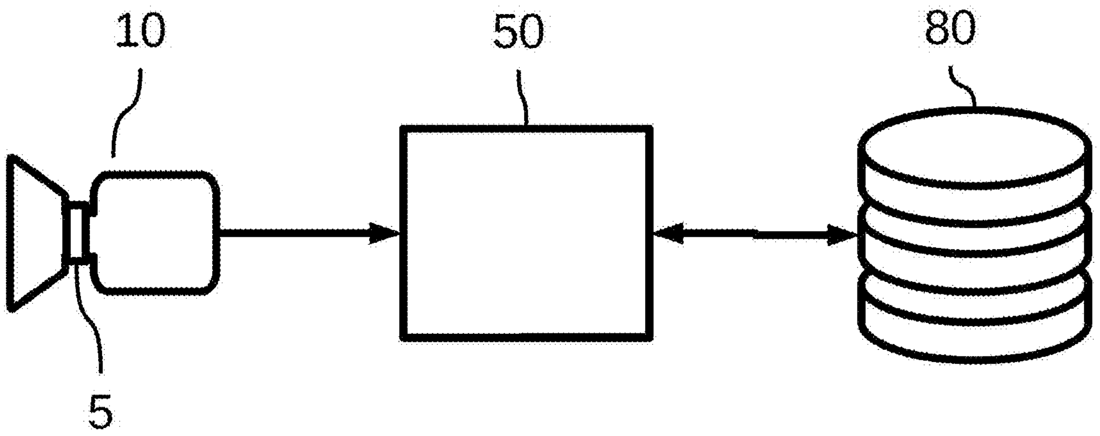
FIG. 1 is a block diagram showing the major hardware elements of the present invention.

FIG. 1 shows a block diagram of the hardware elements in the current design. One or more camera 10 are in communication with a computer 50. The camera 10 may be sending live video frames to the computer 50. The camera 10 may have video saved which may be sent at a later time to the computer 50. The computer 50 is in communication with a database 80. The computer 50 may update and access the database 80 while processing video frame from the camera 10. The camera 10 has a lens 5.

Figure 2:
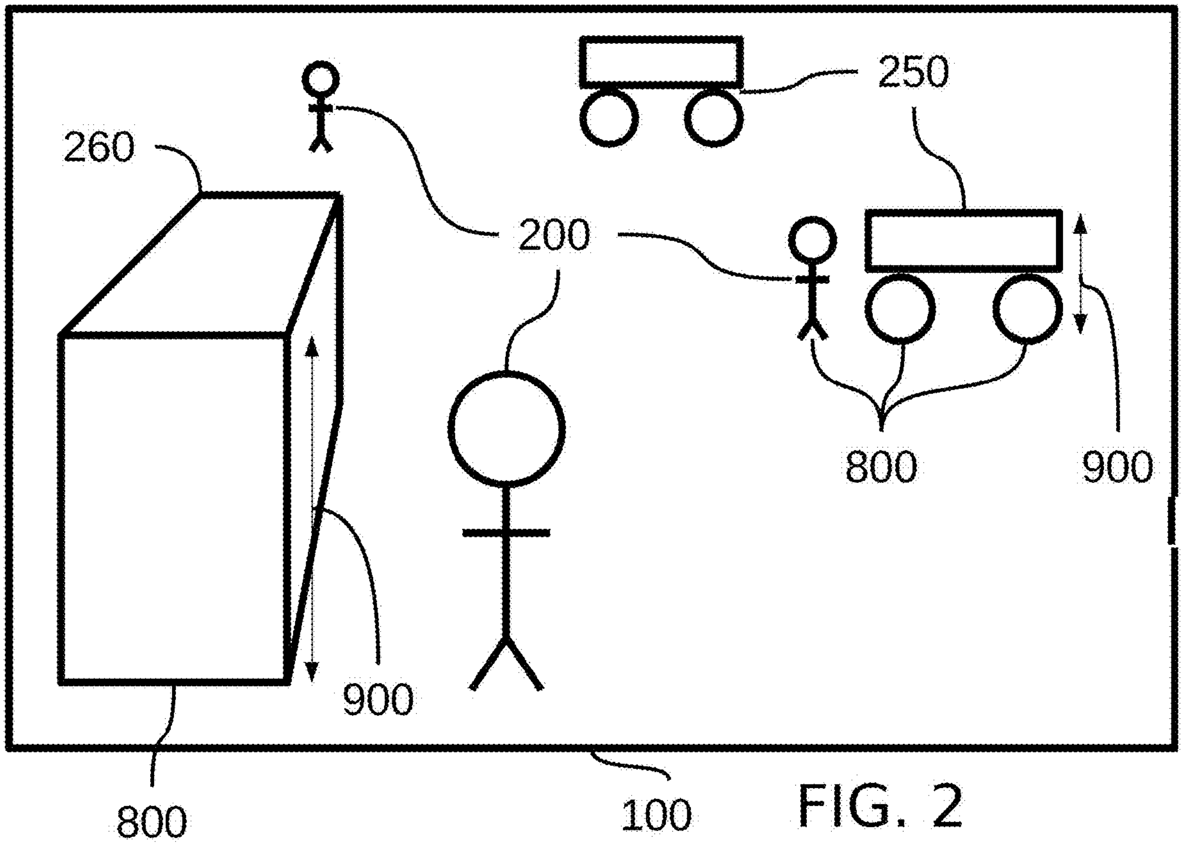
FIG. 2 is an orthogonal view of a video frame containing a selection of objects used for calibrating the camera.

FIG. 2 shows an orthogonal view of a video frame 100. The video frame is comprised of multiple objects. Video frames are acquired from a video source, such as a camera 10. A set of moveable object of varying pixel size 200 can be seen at different parts of the video frame. A set of moving object of known size 250 can be seen in the frame. A set of stationary object 260 are seen in the video frame.

Still referring to FIG. 2, it is understood that moveable object of varying size 200 can without limitation include: humans, suitcases, packages, groceries, fruit, vegetables, manufactured parts, cars, trucks, planes, animals. That is, objects may move themselves or be moved within the Field of View (FoV).

Still referring to FIG. 2, it is understood that moveable objects have a real-world size variation that follows a statistical model with a measurable probability density function. The probability density function may be adjusted for specific circumstances. For example, humans in Northern Europe are typically taller that humans in the Philippines, but both follow a well-defined distribution.

Still referring to FIG. 2, it is understood that the software on the computer 50 can have the probability density function entered in a manual or programmatic way for moveable objects of varying size.

Still referring to FIG. 2, it is understood that objects of known sizes 250 and stationary objects 260 can have their real size entered in manually, or in a programmatic way, into the software on the computer 50.

Still referring to FIG. 2, it is understood that examples of object with known sizes 250 include, but are not limited to: forklift trucks, pallets, bins, totes, robots, cart, sport field marking, sport equipment and trucks.

Still referring to FIG. 2, it is understood that moveable object of varying sizes 200, moving object of known sizes 250, and stationary object 260 are in contact with a level surface of the real-world, which levels are to be detected by the software.

Still referring to FIG. 2, the software identifies pixels in the video frame 100 where objects (200, 250, 260) are in contact with a level surface 800. For example, the software first identifies that the moveable object is a human, and then identifies the pixel where the human's feet touch the floor in the video frame. As another example, if a moving object of known size 250 were a forklift truck, the pixel where the tires met the floor can be identified in the video frame.

The software may employ one of several known machine learning architectures that identify object, preferably segmentation networks. These may be U-Net or DeepLab. The segmentation network is trained to assign every pixel in the image to an object type or background. The objects are typically humans and machines that are expected to exist in that room, whereas the background is generally walls and floors. Preferably a semantic segmentation network is used to classify each of the objects for ongoing tracking during a calibration period. The calibration period may typically be minutes to hours during which objects, preferably under some controlled conditions, move about all regions of the space. The calibration may be repeated to ensure that changes in camera setup are caught.

Still referring to FIG. 2, it is understood that locating the pixel when an object (200, 250, 260) is in contact with the level surface 800 can be done in a programmatic way. For example, the use of computer vision processing can be used to detect wheels on a forklift truck. Another example would be to use a segmented neural network to identify the feet of people or of a pallet.

As modern video cameras provide huge streams of video data, both in terms of frame rate and pixel resolutions, it is preferable to perform some of the segmentation at a first, low-resolution mode for quick, continuous real-time monitoring. The process may be a two part segmentation process, whereby the first segmentation is on low-resolution images, at low frame rate, followed by high-resolution if needed to better identify objects and ground-touching pixels.

Still referring to FIG. 2, it is understood that the moveable object of varying size 200, moving object of known size 250, and stationary object 260 all have a pixel metric 900 that can be measured on the video frame 100 in a programmatic way. The pixel metric may be the height or width in pixels.

Still referring to FIG. 2, it is understood that as more video frames 100 are collected, more pixels of the level surface 800 and corresponding pixel metric 900 for moveable object of varying sizes 200 and object of known size

250 can be collected. This build up a stochastic inference model of objects heights, which is then used by the software to analyze the perspective, distortion, and pose of the camera.

Still referring to FIG. 2, it is understood that the pixel of an object (200, 250, 260) in the video frame 100 is in communication with the level surface 800 and the pixel occupied by the object can be stored in a database 80 in FIG. 1.

Figure 3:
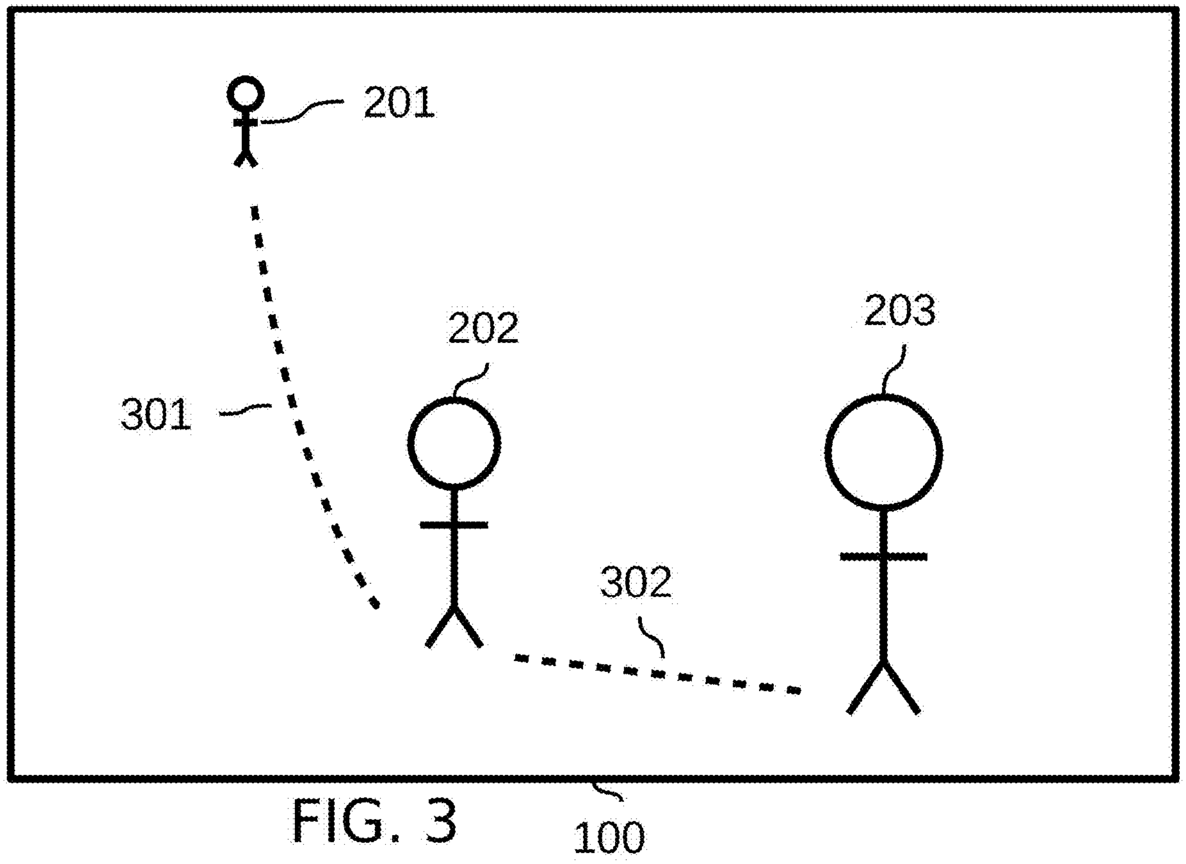
FIG. 3 is an orthogonal view of a series of video frames showing the movement of an object through the video frame.

FIG. 3 is an orthogonal view of a series of video frames 100 showing the path 301/302 of the same object with observations 201, 202, 203 during a calibration period. The object 201, 202, 203 may be a moveable object of varying size 200 or moving object of known size 250. It is understood that the changes in object size are primarily changes in the perspective of the video frame 100.

The pixels where object are in contact with the level surface in observations 201, 202, 203 and the pixel metric of the object at each observation can be recorded into the database 80.

Figure 4:
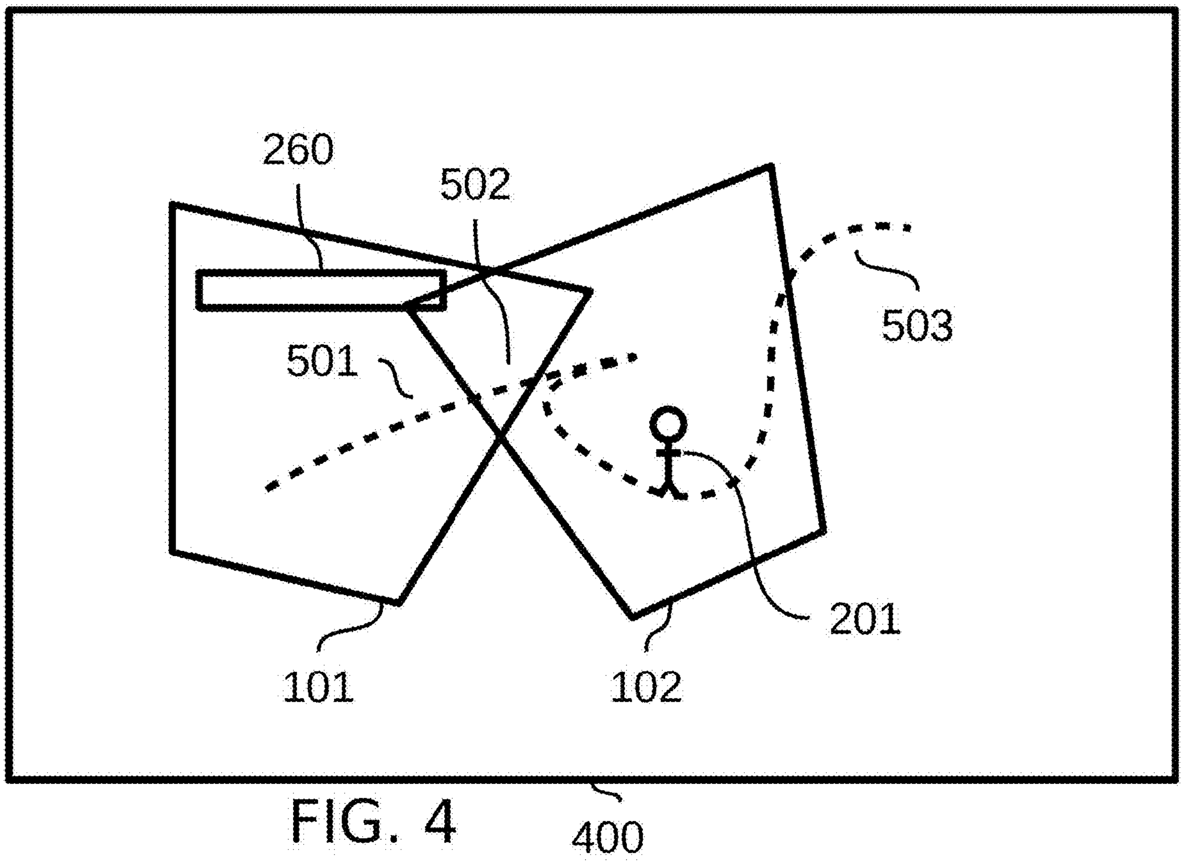
FIG. 4 is an isometrical view of a path which an object takes through one or more video frames.

FIG. 4 is an isometric view of a path 501, 502, 503 an object 201 takes through a map 400 of one or more video frames 101, 102. Sometimes the path 501 can be seen in one video frame 101 and sometimes the path 502 can be seen in more than one video frame 101 and 102, and sometimes the path 503 cannot be seen in any video frame.

Still referring to FIG. 4, it is understood that the object 201 may be a moveable object of varying size 200 or moving object of known size 250. The software may use video tracking techniques to identify the path 501, 502 on the map 400. For example, object tracking may use computer vision processing.

Still referring to FIG. 4, the system may employ non-video techniques to establish the path 501, 502, 503 on the map 400. These techniques include, but are not limited to, IMU dead reckoning, radio tracking, sonar tracking, thermal tracking electro-magnetic fields, touch base sensors, light beams, sound sensors, and global positioning systems. The software may store the path 501, 502, 503 into the database 80.

The software may time-synchronized the paths 501, 502 between the video frames 101, 102 and any other method used to collect the paths 501, 502, 503. It will be appreciated by those skilled in the art, that the path 501, 502, 503 can be established by fusing together "sensor fusion" video and non-video source.

Still referring to FIG. 4, it is understood that the map 400 may be overlaid with known information. For example, architecture drawings or floor plans can be used to enhance the information on the map by providing limits, size expectations, boundary conditions, and key features to register to the map being made by the software.

Still referring to FIG. 4, it is understood that the map 400 may contain known dimension information of stationary object 260.

Still referring to FIG. 4, it is understood that the video frame 101, 102 approximate the location on map 400 which may be specified as starting parameters.

Figure 5:
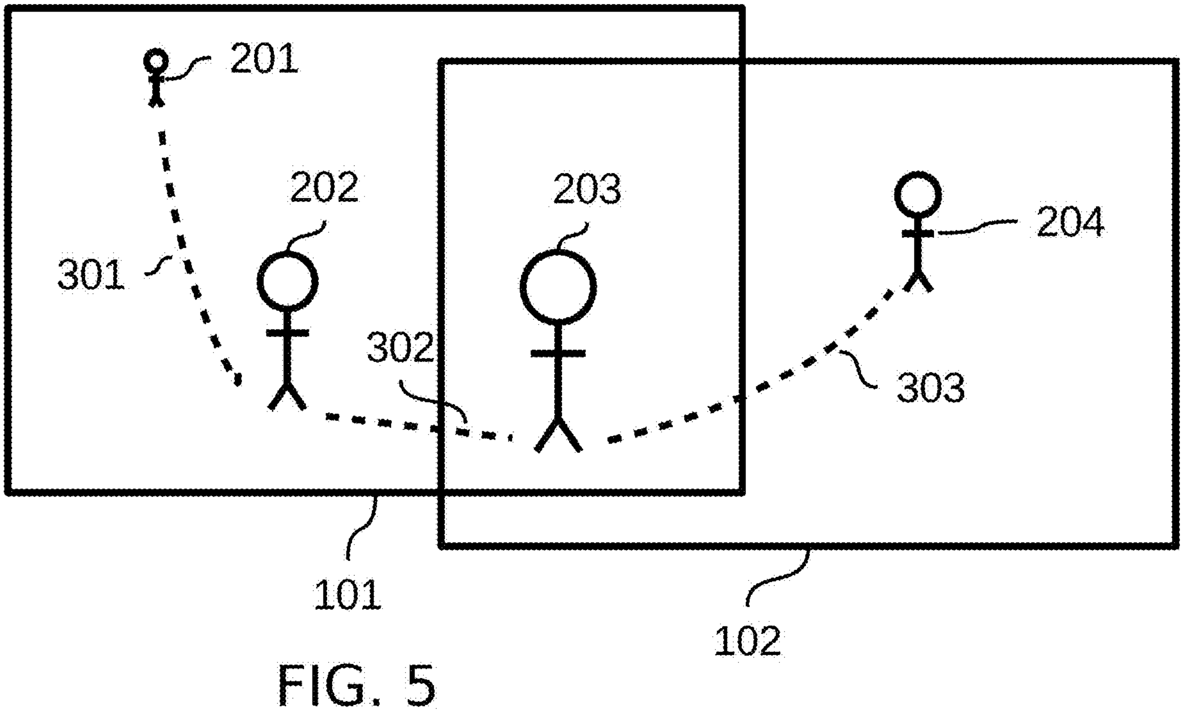
FIG. 5 is an orthogonal view of a series of video frames showing the movement of an object through multiple cameras.

FIG. 5 is an orthogonal view of a series of video frames 101, 102 showing the paths 301, 302, 303 of the same object at 201, 202, 203, 204 through multiple cameras. The object 202 in video frame 101 enters video frame 103 along path 302 arriving at the location of object 203. At this stage, object 203 is visible in both video frame 101 and 102. It is understood that the pixel when object 203 is in communication with the level surface can differ between the video frame 101 and 102.

The pixel where object 203 is in contacts with the level surface can differ between the video frame 101 and 102. The software may use pattern recognition to understand the behavior of an organic object.

Figure 6:
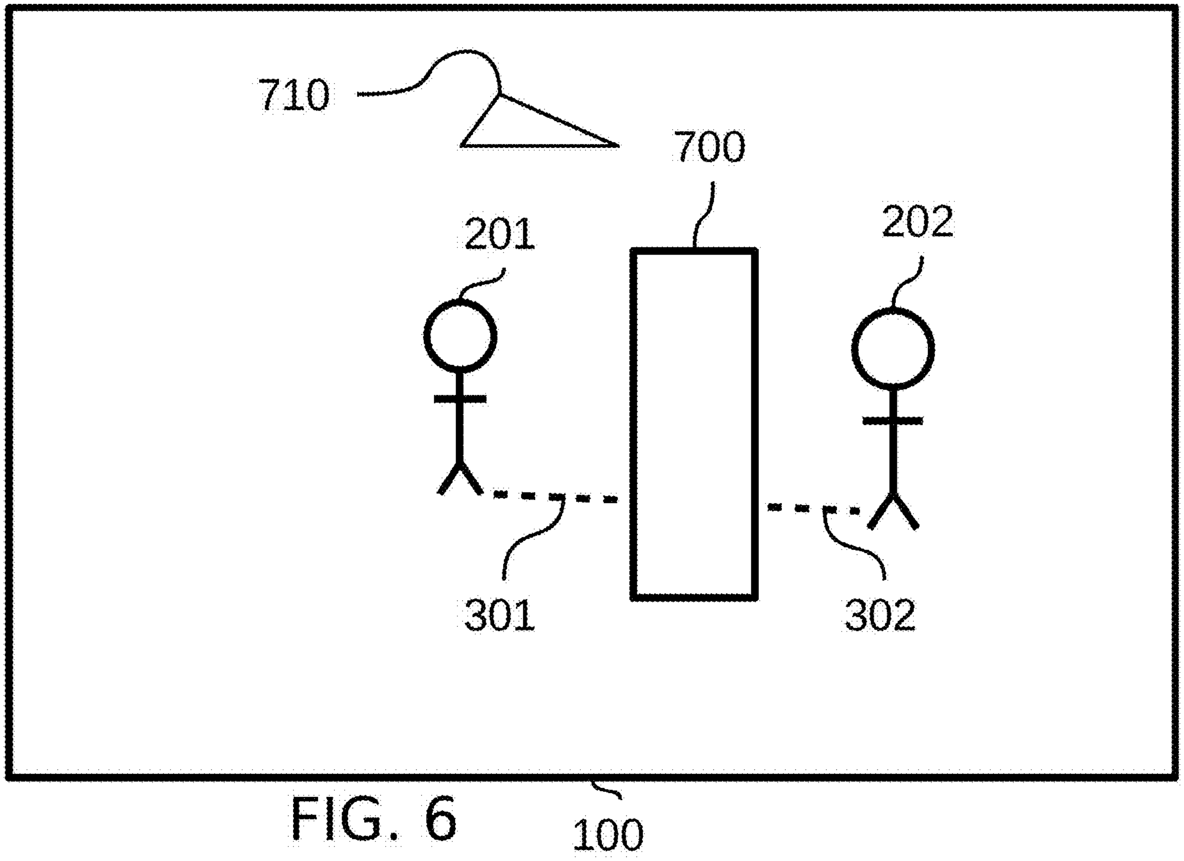
FIG. 6 is an orthogonal view of a video frame showing the movement of an object behind an occlusion including a light source/illumination.

FIG. 6 is an orthogonal view of video frame 100 showing the paths 301, 302 of an object at 201, 202 behind an occlusion 700 in the presence of illumination 710 of the space Preferably the object 202 is recognized as the object 201 after passing behind the occlusion 700, or if illumination 710 fails, or if the object at observation 202 is missing identification information in one or more frame. The software may use sematic segmentation to uniquely learn and identify objects such tracking or the object may have fiduciary markings that uniquely identify it to the software. In the above cases of imperfect identification, the software is programmed with some threshold of object matching probability to continue the tracking. This matching probability may be strengthened by finding the most similar object to a prior object in that area with that motion vector.

Figure 7:
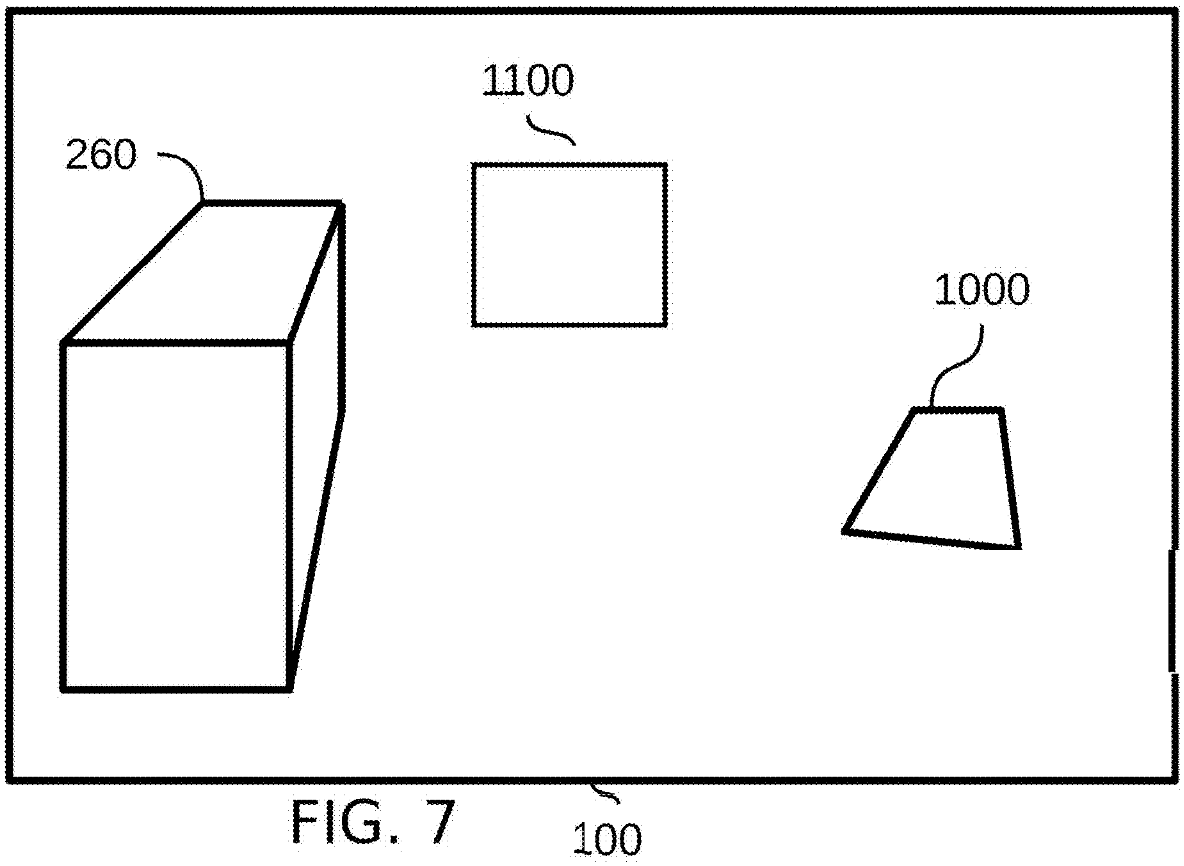
FIG. 7 is an orthogonal view of a video frame showing a change of object in a video frame.

FIG. 7 is an orthogonal view of video frame 100 showing a change of object 1000, 1100. The software may be programmed to classify objects in the video frame 100 that have not moved for some threshold time as stationary object 260. Software can detect changes in the video frame 100. For example, if a new object 1000 enters the frame and stays in the same position for longer than some threshold time, it can be considered a new stationary object 260.

Figure 8:
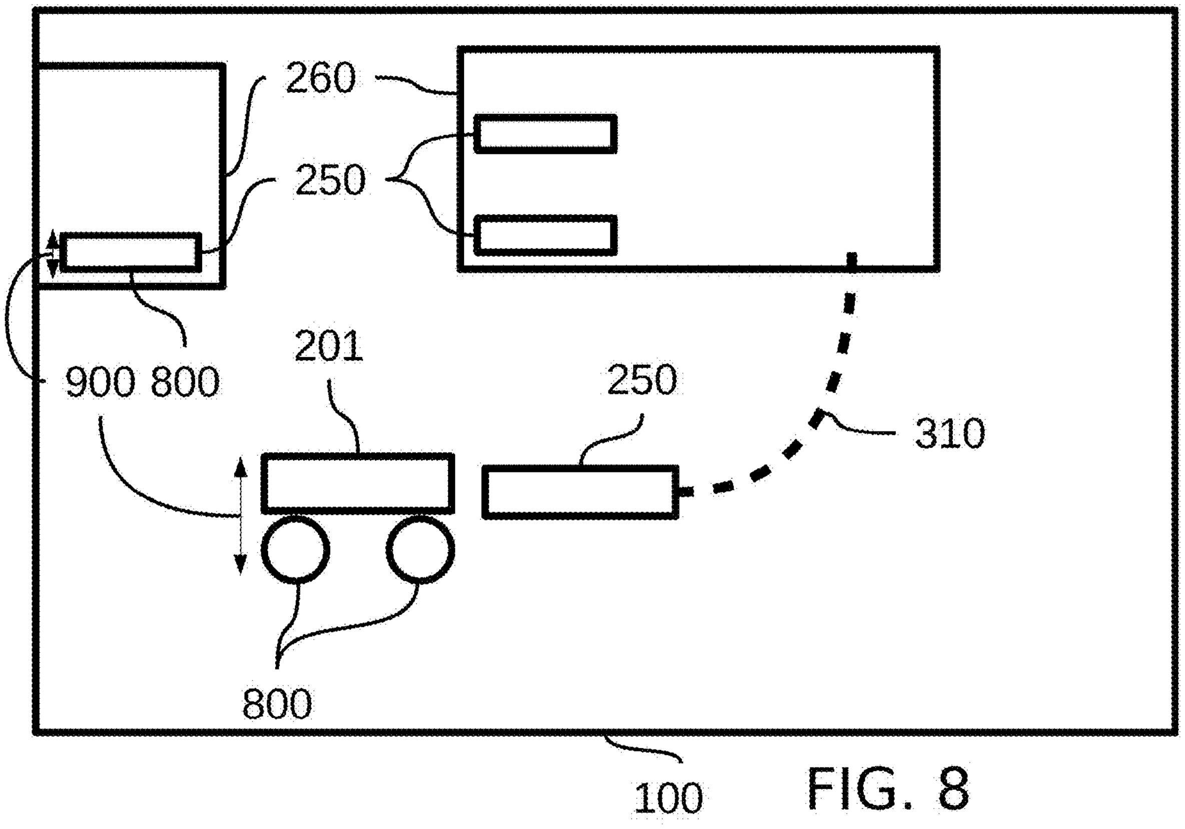
FIG. 8 is an orthogonal view of a video frame showing object that can be tracked in video frame.

FIG. 8 is an orthogonal view of video frame 100 showing objects of known sizes 250 in stationary object 260 and in communication with object 201. Object 201 may be an object of variable or known size. The object of known size 250 have a pixel metric 900 and are in contact with the level surface 800. The object's path 310 can be tracked in video frame 100. The object 250 may be pallets and totes.

PREFERRED IMPLEMENTATION

The following examples are set forth to provide those of ordinary skills in the art with a complete disclosure of how to make and use the aspects and embodiments of the invention as set forth herein.

It is understood that object of varying size will be used to build up a probabilistic model of pixel metric at each location. As enough data is gathered, the actual height can be established through standard statistical means in a programmatic way.

As more pixels for the level surface and pixel metrics are collected in the frame, a database of pixel locations and pixel metric can be established. When an object moves through a series of frames, the pixel metric can be used to make direct comparison between different parts of the video frame. The database of pixel for the level surface can then be interpolated to establish the level surface of the video frame.

The database of the pixel for the level surface and the pixel metric of the object can then be used to establish the physical distance represented by pixels in a localized portion of the video frame.

At each pixel in the convex hull of the known pixel for the level surface the software can interpolate where the level surface is using standard techniques known to those skilled in the art. These techniques allow us to remove the distortion caused by the lens 5.

At each pixel in the convex hull of the recorded pixel for the level surface, the size of an object can be established via the interpolation of the pixel metric database using techniques known to those skilled in the art.

Distortions in the lens 5 can be corrected by analyzing the curvature in the level surface, and by analyzing the paths taken by objects in the plane. The level surfaces tend to be flat even at different levels, and the path tend to be piecewise linear. For example, at a corner the path tends to be L-shape. The algorithms for straightening the image in the video frame are well known to those skilled in the art.

When an object is tracked moving between two cameras, the level surface of the two camera views that overlap can be compared. The two level surface need to match. The discrepancy, if any, between these level surfaces can be used to adjust the inherent camera angles to move into alignment and to remove lens distortion from both cameras using techniques known to those skilled in the art.

After learning the distance information for pixel at the level surface, it is now possible to precisely track how far objects move in the video frame.

When a path can be established independently from the video frame, as shown in FIG. 4, objects can be tracked even when not visible by any camera. For example, a cell phone app can use the IMU to track the path of a person walking.

Using well-known techniques by those skilled in the art, the path seen on the video frame and the path established independently from the video frame, can be combined to produce a more accurate model of the ground truth path.

This more accurate path provides dimensional data for the entire area covered by the cameras.

These accurate maps now can be used with path tracking in the video frame to estimate the distance that objects move in the frame.

These accurate maps can be used to calculate the velocities of objects as they are moving.

The path established independently from the video frame can be used to track an object as it moves between two video frames.

The path established independently from the video frame can be used to re-identify objects that became hidden by occlusions or missing a set of frames due to illumination issues.

It will be appreciated by those skilled in the art, that when these techniques are combined, a detailed map 400 in FIG. 3, can be obtained in a programmatic way. This map can be established entirely from the video frame.

An object that becomes a new stationary object 1000 in FIG. 7 or an unexpected object which is missing can be an issue. The software might identify these objects as changing the flow of movable objects.

Furthermore, missing or false located objects can become an issue for obvious reasons.

In FIG. 8 we can see object of know sizes 250 being moved by other objects 201. It is clear that objects of known sizes 250 can be tracked and their stationary locations recorded. This information can then be used to map and track the location of objects over time.

It will be appreciated by those skilled in the art, that being able to track the locations on a map of how objects move within and between video frames, would allow a database of information to be built about the flow and location of objects.

Expanding on the database, so that objects are logged when the enter/leave an area, average time spent on a shelf is noted, staff members' speed is noted and ranked; patterns are studied as a function of time of day, time of year (e.g., maybe toys sell more in the holidays than other days; maybe staff walk faster on Tuesdays, etc.), etc.

Figure 9:
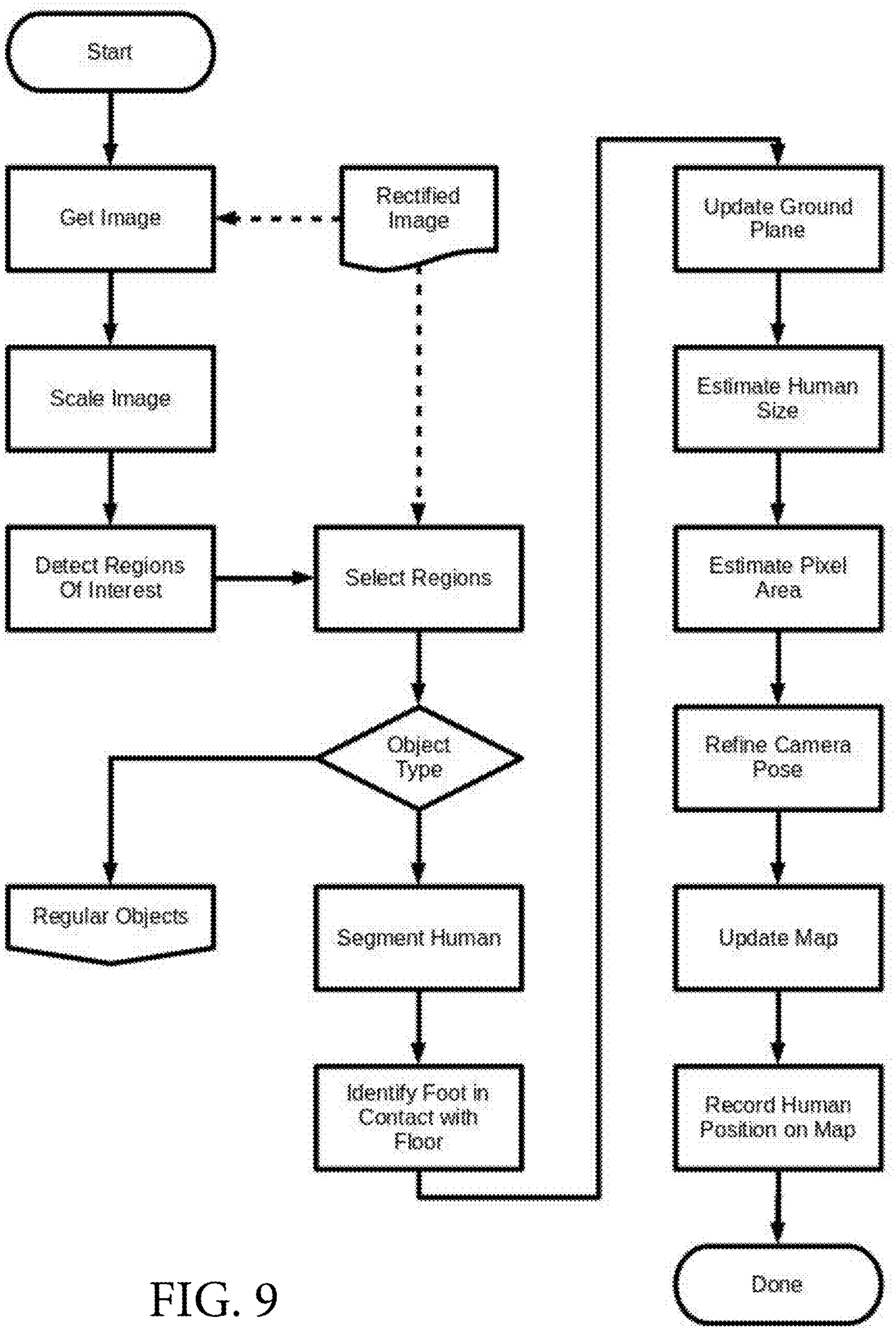
FIG. 9 is a flowchart for creating a map from objects detected in images.
Figure 10:
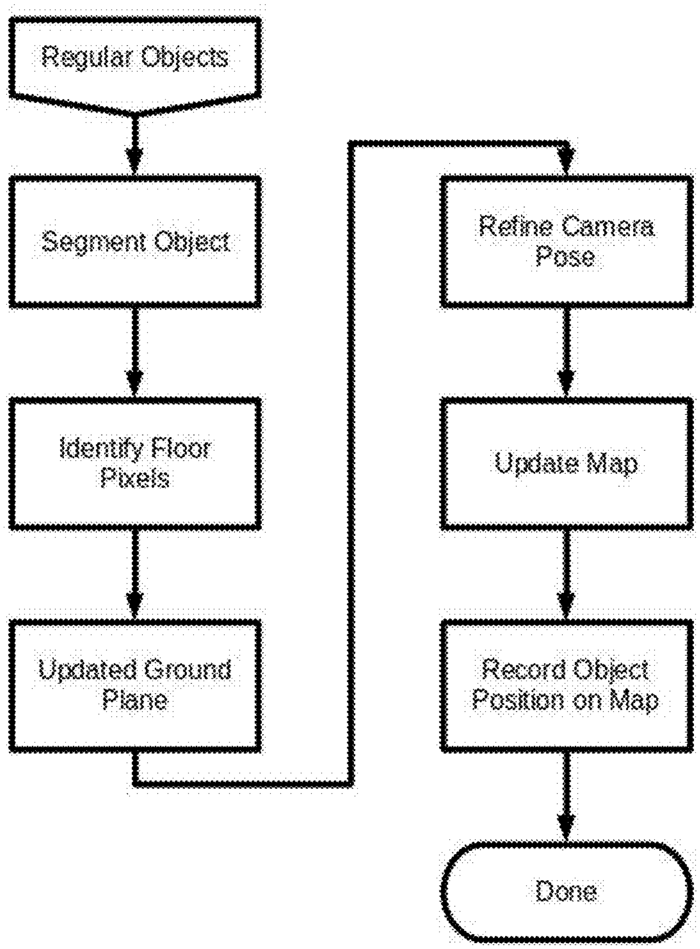
FIG. 10 is a flowchart for updating a map from non-human objects.

A Mapping algorithm flow chart of operations is provided in FIGS. 9 and 10. With reference to FIG. 9, a rectified image is acquired. This is an image that has been corrected for camera distortion. The rectified image is scaled down using standard techniques. The smaller image is then processed with a saliency filter to identify the regions of interest. This can be done by looking for objects that are moving in the frame or with a neural network. Neural networks that can detect points of interest include Yolo or FairMOTS. Both these algorithms have the ability to assign in identification of objects to track them between frames.

The system may output a mapping model to convert from pixel space in the video images to physical space in the map of the room. This mapping considers the distortion of the lens, pose of the camera, and perspective effects to provide an accurate metrical map from the camera. Thus the camera system becomes calibrated.

Every region of interest is cut from the original full sized image to create a segmentable image.

If the region of interest is not a human, the algorithm uses the flowchart of FIG. 10. The segmentable image of the human is segmented at the pixel level to identify where the human(s) are inside the image. There are several neural networks that can do this, such as U-Net, and DeeplabV3.

Once the image has been segmented at the pixel level, the software determines which foot is touching the floor. This may be done using a neural network such as V2V-PoseNet to determine which leg is straighter and then classify its bottommost pixels as ground pixels.

Knowing which pixels are touching the floor, the software can update the map of the ground plane. The software may then estimate the height of the human based on the statistical distribution of pixel heights seen of other humans in the same region. This estimate improves over time, as more humans are seen in the region. Humans follow a predictable statistical distribution. Based on the estimated human height, an area for each ground pixel can be estimated.

By looking at how the area of pixels change across the image, the software can estimate the pose of the camera. This is done using a curve fitting algorithm base that adjust the 6DOF of the camera position along with the estimated intrinsic camera matrix. One can improve the stability of this algorithm by making an initial guess of the Pose of the camera using a neural network, like PoseNet.

From the camera pose and the ground plane pixels, the software can update the model of the 2D floor map by projecting the known floor pixel onto a 2D map using the pose of the camera.

The software can now update the location of the human onto the 2D map, using the ID of the human as reported by the saliency filter.

FIG. 10 shows how non-human objects are processed. It is assumed that for non-human object, the system stores information about the object size, speed, behavior and ground contacting points. The object may be a pallet or forklift truck.

Non-human objects, in particular stationary objects and structural objects, may be used by the software to correct for curvature and distortion of the lens. Vertical aspects of these objects that have been learned or stored in the database should be captured as straight vertical pixels in the image, and the software may rectify (i.e. undistort) the raw image until these vertical aspects are straight in the rectified image. For example, structural pillars in a building can be assumed to be straight but fisheye effects may curve them when at the edges of the raw image.

The system uses a neural network to segment the object. The neural network is specific to the object type. The neural network can identify different parts of the object such as wheels on a forklift truck. Example neural network to do the segmentation are U-Net, and DeeplabV3. Once the image has been segmented, the pixels touching the floor are identified. These are assumed to be the pixels nearest the bottom of the segmented image that can possibly touch the floor.

As the software now knows the object's real-works size, the software can now estimate the real world area that a pixel represents. For example, a 1-meter pallet that is 100 pixels wide in the image, implies that each pixel is 1 cm wide at that part of the frame. This pixel size calibration enables the software to accurately compute speed and distance traveled by an object.

Just as with the human estimation, the system can now refine the camera pose and then update the 2D map of the floor. Finally the object type, ID, time, and location can be entered into the 2D Map.

The system may use the architecture and teaching of C. Chen, C. X. Lu, J. Wahlström, A. Markham and N. Trigoni, "Deep Neural Network Based Inertial Odometry Using Low-Cost Inertial Measurement Units," in IEEE Transactions on Mobile Computing, vol. 20, no. 4, pp. 1351-1364, 1 Apr. 2021, doi: 10.1109/TMC.2019.2960780.

APPLICATION EXAMPLES

The following examples are provided to help illustrate uses of the system.

One embodiment would be a warehouse. The software uses the statistical method described previously to create localized pixel metric for the pixel at the surface plane. Employees in the warehouse wear a cell phone, running a tracking application that monitors the internal Inertial Measurement Unit (IMU). The path from the IMU is matched with the video frame of the camera. The software on the computer 50 in FIG. 1 can then match the path between the IMU and the path as recorded on the camera 10. This now allows the software to automatically assemble the map 400 as shown in FIG. 4. The software can calculate the velocities and positions for all objects in the map. The software can create spaghetti maps including accurate metrical information of movement based on this data in real time, or at a later date.

One embodiment would be a warehouse. In the warehouse the racks holding the goods are recorded with cameras. The embodiment in the warehouse would be tracking forklift trucks. In this case the forklift has a small device containing an IMU with a wireless transmitter. The software running on the computer 50 can have the dimensions of the forklift entered. Now as it analyzes the frame, the forklift is known and the pixel metric calculated. From this data, the software can automatically create the map 400 as shown in FIG. 4. This allows the software to track and know where (location) and when packages were placed or removed in a warehouse, racking or location.

Another embodiment for tracking forklift trucks is to use a visual fiducial to both identify the forklift, and to allow the camera system to track the height of the forks inside the video frame. The video frame can estimate the height of the forks are by looking at the pixel metric on the video and examine the location of the visual fiducial to expect position when the forks are near the level surface.

One embodiment would be a warehouse. In the warehouse the racks holding the goods are recorded with cameras. The software uses the statistical method described previously to identify missing object 1100 or new object 1000. This information could be communicated with other software in the warehouse being responsible for inventory.

One embodiment would be a Sports facility. The software uses the statistical method described previously to create localized pixel metrics for the pixel at the surface plane. The software can calculate the velocities and positions for all organic objects, e.g. players, and non-organic objects, e.g. a ball in the map or on the sports facility. The software can create spaghetti maps including accurate metrical information of movements based on this data in real time, or at a later date. This allows gaining real-time and predictive information about the physical condition of numerous individual sport players. The data collected this way can also be used to analyse the teams' and the opponents' tactics and allows real time adaptations. Furthermore, statistical data around individual sport players, such as maximum speed or maximum distance before fatigue, and teams, such as attempts on goal or averages can be inferred which yields economic evaluation in the transfer and betting market.

Another embodiment would be an Airport or similar crowed place or areas. The software uses the statistical method described previously to create localized pixel metric for the pixel at the surface plane. The software can calculate the velocities and positions for all organic object in the map or on crowed area (e.g. airport). This information could be communicated to a control software. The control software furthermore could influence the flow, e.g., by Text Messages on TV screen by letting passengers walk to less busy security gates.

One embodiment would be a safety fairway system. The software uses the statistical method described previously to create localized pixel metric for the pixel at the surface plane. Humans in buildings wear a cell phone, running a tracking application that monitors the internal Inertial Measurement Unit (IMU). The path from the IMU is matched with the video frame of the security camera. The software on the computer 50 in FIG. 1 can then match the path between the IMU and the path as recorded on the camera 10. This now allows the software to automatically assemble the map 400 as shown in FIG. 4. The software can calculate the velocities and positions for all objects in the map. The software can create spaghetti maps including accurate metrical information of movements based on this data in real time, or at a later date. This allows a systematic and intuitive design of safety fairways during practice runs using predictive analyses of the escape duration. In cases of an emergency, escape routes can be analyzed and dynamically adapted through real-time communication with humans if they are blocked (e.g. fire blockage).

One embodiment would be greenhouses and vertical greenhouses as well farming and agriculture. The software uses the statistical method described previously to create localized pixel metric for the pixel at the surface plane. Relative to the generated accurate metrical information the software can detect plant growth and learn parameters that contribute to growth of the plant.

One embodiment would be Zoo. The software uses the statistical method described previously to create localized pixel metric for the pixel at the surface plane. The software can calculate the velocities and positions for all organic object e.g. animals in Zoo. The software can create spaghetti maps including accurate metrical information of movements based on this data in real time, or at a later date. This allows gaining real-time and predictive information about the physical condition of the animal.

One embodiment would be a shopping mall. The software uses the statistical method described previously to create localized pixel metric for the pixel at the surface plane. This allows the software to analyze how people move in the shopping mall which gives a correlation between the buying behavior and the movement of people. This information allows a systematic outline of shops and shopping malls including facility locations such as restaurants, restrooms, etc. Furthermore, the flow of visitors could be also managed by other software instances e.g. a visitor could receive a shopping coupon on the cell phone to visit a certain shop.

One embodiment would be a parcel handling facility. The software uses the statistical method described previously to create localized pixel metric for the pixel at the surface plane. The software can calculate the velocities and positions for all objects in the map including packages on a parcel conveyor or parcel sorter. The software can communicate such information to another control software in the facility which can manage the parcel flow, velocity, number of parcels induction speed, etc.

One embodiment would be the construction site of a building. The software uses the statistical method described previously to create localized pixel metric for the pixel at the surface plane. This allows to gain real-time metrical information about the distance that employees/workers covered in their shift. This information, furthermore, is relevant to health and safety of the employees as it infers the fatigue of workers on-site.

As used in this specification and the appended claims, the singular forms "a," "an," and "the" include plural referents unless the context clearly dictates otherwise. The terms "comprises" and/or "comprising," as used in this specification and the appended claims, specify the presence of stated features, integers, steps, operations, elements, and/or components, but do not preclude the presence or addition of one or more other features, integers, steps, operations, elements, components, and/or groups thereof.

As used herein, the term "communication" and "in communication" is meant to refer to components of the device that work together but are not necessarily connected to each other. In addition, there may be additional processing elements between the components.

As used herein, the term "video frame" is used to describe a single image.

As used herein the term "pixel" refers to one point in a video frame.

As used herein the term "pixel metric*size" refers to a measure of the size of an object. It may refer to the number of vertical pixels of an object in a video frame, or the width in pixels of an object. It could be the total number of pixels an object occupies, or a bounding box around the object.

As used herein, the term "set" is used to describe a collection of zero or more objects that have an underlying similarity.

As used herein, the term "level surface" is used to describe a z-axis location an object can rest on.

As used herein, the term "map" is used to describe a geometrically accurate visualization of the space and object captured by the camera and other tracking technologies.

As used herein, the term "programmatic way" is used to describe an algorithm that is implemented in hardware and/or software.

As used herein, the term "video source" is used to describe a device or software that produces video frames.

As used herein, the terms "sensor" and "sensors" is used to describe a device that measures one or more physical attributes.

As used herein, examples for sensors would be thermal cameras, vibration, sound waves, etc.

As used herein, the term "illumination" is used to describe the use of light sources.

As used herein, the term "camera" is used to describe a two-dimensional array of optical sensors. Each sensor in the array measures electromagnetic radiation.

As used herein, the term "convex hull" is used to describe a space created by all linear combinations from a collection of points where the coefficients used in the linear combinations are greater than or equal to zero, and the sum of all the coefficients is one.

As used herein, the term "pattern" is used to describe the behavior of organic object.

The invention claimed is:

1. A method of calibrating a video camera capturing a space comprising:
- a. receiving images from the camera;
- b. identifying objects within the images;
- c. tracking the identified objects as they move;
- d. using changes in size of the tracked objects as they move to infer perspective in the video camera;
- e. comprising determining real-world sizes of pixels at different locations of the image; and
- f. using the inferred perspective to create a mapping model to convert pixels in the received images to a metrical map of the space.

2. The method of claim 1, further comprising creating corrected images from the received images by correcting for the inferred perspective and distortion effects of the lens.

3. The method of claim 1, wherein objects have fiduciary markings to uniquely identify them.

4. The method of claim 1, wherein a segmentation model is used to identify objects.

5. The method of claim 1, wherein a semantic segmentation model is used to identify objects.

6. The method of claim 1, further comprising building up a statistical inference model of a height of the objects.

7. The method of claim 1, further comprising classifying objects as moving or stationary objects.

8. The method of claim 1, further comprising inputting floor plans to constrain the map creation and register identified objects of the map to features of the floor plan.

9. The method of claim 1, further comprising defining a pose of the camera with respect to the space from the changes in size of the tracked objects.

10. The method of claim 1, wherein identifying and tracking objects is performed during a calibration period.

11. The method of claim 1, wherein at least some of the objects carry an IMU to identify that object and its dimensions.

12. The method of claim 1, further comprising continuing to track objects using the mapping model to compute movement metrics for a given object.

13. A system comprising:
- a. one or more video cameras capturing a space;
- b. computer operatively connected to receive video from the one or more video cameras;
- c. a database of objects expected to be in that space and their dimensions; and
- d. a memory storing instructions, which when executed by the computer, cause the computer to carry out the method of claim 1.

14. A method of creating a map from a video camera capturing a space comprising:
- a. receiving images from the camera;
- b. identifying objects within the images;
- c. tracking the identified objects as they move;
- d. using changes in size of the tracked objects to infer perspective in the images;

e. comprising determining real-world sizes of pixels at different locations of the image;

f. determining parts of the objects that contact a floor to determine locations of ground pixels in the image; and g. creating a 2D metrical map of the space from the inferred perspective and the locations of ground pixels.

15. The method of claim 14, further comprising using pose estimation to determine a leg as a part of the object contacting the floor.

* * * * *